Patented Sept. 2, 1952

2,609,402

UNITED STATES PATENT OFFICE 2,609,402

OLEFIN-DDT REACTION PRODUCTS

Elbert C. Ladd, Passaic, N. J., assignor to United States Rubber Company, New York, N. Y., a corporation of New Jersey No Drawing. Application March 23, 1949,
Serial No. 83,101

9 Claims. (Cl. 260—649)

The invention relates to certain new organic chemicals obtained by the reaction of 1,1,1-trihalogeno-2,2-diarylethanes with 1-olefinic hydrocarbons in the presence of a source of free radicals. In particular, my invention concerns the free-radical-catalyzed reaction of a lower aliphatic Δ'-monoolefinic hydrocarbon with a 1,1,1-trihalogeno-2,2-diarylethane, especially 1,1,1-trichloro-2,2-bis-(p-chlorophenyl)ethane and 1,1,1-trichloro-2,2-bis-(p-methoxyphenyl)ethane.

It is known that the trichloromethyl compound chloroform reacts with olefins under free radical conditions in the sense (1) 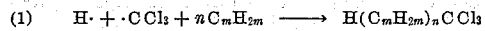

to form compounds containing the trichloromethyl group intact.

The commercial chemical known as "DDT" is a 1,1,1 - trichloro - 2,2 - diarylethane having the formula

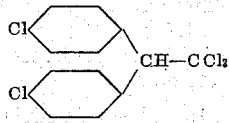

It is not apparent from a consideration of this structure what type of product would be formed upon reaction with ethylene under free radical conditions.

However, I have discovered that under free radical conditions, DDT reacts with ethylene to form compounds having the formula given in the following equation:

(2) 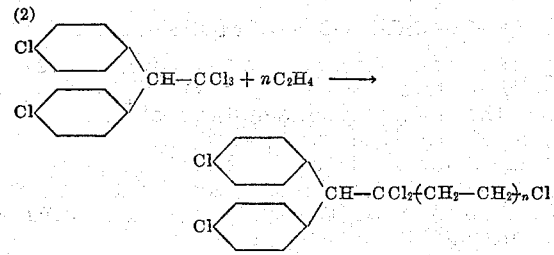

where $n$ is an integer of from 1 to 10. It was surprising that the hydrogen on the trichloromethyl diaryl methane was untouched. It was also surprising that the chlorine atoms on the phenyl were untouched.

I have further discovered that the other 1-alkenes react in a similar manner. The general reaction of my invention is represented as follows:

(3) 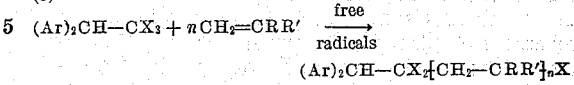

where Ar is an aryl group, almost invariably phenyl or substituted phenyl, X is halogen, usually chlorine or bromine, $n$ is an integer of from 1 to 10, and each of R and R' is either hydrogen or alkyl.

Any aliphatic monoolefinic hydrocarbon having a terminal $CH_2$= group may be used in the practice of my invention. The Δ'-olefinic hydrocarbon will typically contain from 2 to 20 carbon atoms per molecule. Examples of suitable 1-alkenes are ethylene, propylene, 1-butene, isobutylene, and any of the pentenes, hexenes, heptenes, octenes, nonenes, decenes, dodecenes, etc., having a terminal =$CH_2$ group.

The most highly preferred products of my invention are those obtained by the reaction of 1,1,1-trihalogeno-2,2-diarylethanes, particularly DDT, because of its cheapness, with the lower aliphatic mono-1-olefinic hydrocarbons typified by ethylene, propylene, and the Δ'-butylenes and pentenes.

Instead of DDT, I may use any other 1,1,1-trihalogeno-2,2-diarylethane. An especially useful compound for use in place of DDT is the compound known as methoxychlor, which is 1,1,1-trichloro-2,2-bis(p-methoxyphenyl)ethane. Examples of other compounds related to DDT which may be used in the practice of my invention include 1,1,1 - trichloro - 2,2 - bis(p - fluorophenyl)ethane; 1,1,1-trichloro-2,2-bis(p-bromophenyl)ethane; 1,1,1 - trichloro - 2,2 - bis(3,6-dibromophenyl)ethane; 1,1,1-trichloro-2,2-bis(p-methylphenyl)ethane; 1,1,1-trichloro-2,2-bis(3-methyl - 4 - chlorophenyl)ethane; and 1,1,1-trichloro-2,2-bis(2 - methyl - 4,5 - dichlorophenyl) - ethane.

The products of my invention are useful as insecticides, lube-oil additives, plasticizers, textile assistants, dye intermediates, etc. The reaction products of DDT with lower aliphatic olefins typified by ethylene, propene and isobutylene are especially useful as insecticides. The 1:1 adduct of DDT with ethylene (i. e., a compound having the formula of the reaction product of Equation 2 above wherein $n$ is 1) is not as active as the next higher adducts wherein $n$ is 2 or 3 but it is still quite an effective insecticide. The adducts of DDT and ethylene wherein $n$ is 2 and 3 are as active as DDT itself except that they are slower acting.

The reactions of my invention are carried out by heating at 25°–300° C., usually at 60°–200° C., a mixture of the mono-1-olefinic hydrocarbon and the 1,1,1-trihalogeno-2,2-diarylethane, preferably in molar ratios of from 1:10 to 10:1, especially from 1:10 to 1:1, and in the presence of a source of free radicals. The latter may be a source of actinic light, usually ultra-violet light or from 0.1 to 15% by weight (based on the reactants) of a compound capable of undergoing thermal decomposition to form free radicals. Exemplary of such compounds are the peroxides, such as hydrogen peroxide, organic peroxides such as benzoyl peroxide, acetyl peroxide and tertiary-butyl hydrogen peroxide, and metal alkyls, such as sodium amyl and lead tetraethyl. Thus, the reactions are usually carried out in the presence of a free radical reaction initiator selected from the class consisting of actinic light and peroxides and metal alkyls capable of liberating free radicals under the prevailing reaction conditions. The reaction times will vary somewhat with the conditions and reactants employed but times in the range of from 1 to 60 hours are usually adequate, and from 10 to 48 hours may suffice. The use of highly volatile reactants, e. g., ethylene, may require superatmospheric pressures, usually in the range of from 10 to 200 atmospheres, typically from 500 to 1000 pounds per square inch. The reaction can be carried out in the presence or absence of inert diluents such as saturated or aromatic hydrocarbons, e. g., hexane, octane, cyclohexane, kerosene, benzene and toluene.

The reaction products can be isolated by removal of unreacted starting materials through distillation or preferential extraction, and further purification can be effected, if desired, by fractional distillation.

The following examples disclose my invention in more detail.

*Example 1*

One hundred and eighty-four grams of 1,1,1-trichloro - 2,2 - bis(p-chlorophenyl)ethane and about 5.5 parts of tertiary-butyl hydrogen peroxide are enclosed in a 480 ml. pressure vessel. The vessel is heated to 140° C. Ethylene is introduced to a pressure of 600 p. s. i., and the vessel is agitated by shaking for 44 hours at this temperature, while the initial pressure is maintained by appropriate additions of ethylene, as required.

At the end of the reaction, the vessel is cooled and vented. The reaction mixture is a semisolid crystalline mass (percent chlorine=44.6) from which the majority of the unreacted 1,1,1-trichloro - 2,2 - bis(p-chlorophenyl)ethane is removed by dissolving the entire mixture in 600 ml. of boiling n-hexane, filtering, and cooling to precipitate the DDT. The crystals are removed by filtering, and the filtrate is evaporated to remove the solvent. Of the viscous liquid residue (percent chlorine=38) 51.5 grams are fractionally distilled to yield 27.5 grams of a material consisting essentially of the new compound 1,5,5-trichloro-6,6-bis(p-chlorophenyl)hexane, B. 155–175° C./2 mm. (percent chlorine=42.5; theory=43.2) and 11.9 grams of a higher boiling material consisting essentially of the new compound, 1,7,7-trichloro - 8,8 - bis(p-chlorophenyl)octane (percent chlorine=40.63; theory=40.41). The residue (4.2 grams; percent chlorine=33.54) contains higher adducts.

*Example 2*

A mixture of 500 gms. of DDT and 19 gms. of tertiary-butyl hydrogen peroxide is enclosed in a pressure vessel. The vessel is closed and evacuated after which gaseous ethylene is admitted until a pressure of approximately 940 lbs. per sq. in. is attained at a temperature of 140° C. The reaction is carried out for a total of 48 hours with agitation and at the above mentioned pressure and temperature.

At the conclusion of the reaction the mixture is dissolved in n-hexane, and unreacted DDT is isolated therefrom by repeated crystallization. The residue after removal of the solvent contains 38.82% chlorine. Approximately 50% of the residue volatilizes (B. 189–194° C./1.3 mm.) when heated under reduced pressure, and the chief product which can be isolated by recrystallization of the crude distillate consists essentially of the new compound 1,3,3-trichloro-4,4-bis(p-chlorophenyl)butane, M. 106–107° C., (per cent chlorine=45.10; theory=46.34%). The distillate yields a small amount of another compound, M. 126–127.5° C., containing 34.76% chlorine.

Having thus described my invention, what I claim and desire to protect by Letters Patent is:

1. A new chemical compound having the formula

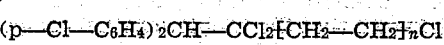

where $n$ is an integer of from 1 to 3.

2. 1,3,3-trichloro-4,4-bis(p-chlorophenyl) butane.

3. 1,5,5-trichloro-6,6-bis(p-chlorophenyl) hexane.

4. 1,7,7 - trichloro - 8,8 - bis(p - chlorophenyl) octane.

5. The process which comprises heating a mixture of 1,1,1-trichloro-2,2-bis(p-chlorophenyl) ethane and a 1-alkene in the presence of a free radical reaction initiator, and recovering an adduct having the formula

where $n$ is an integer of from 1 to 3 and R and R' are selected from the group consisting of hydrogen and alkyl, from the reaction mixture.

6. The process which comprises heating a mixture of 1,1,1-trichloro-2,2-bis(p-chlorophenyl) ethane and ethylene in the presence of a free radicals reaction initiator, and recovering an adduct having the formula

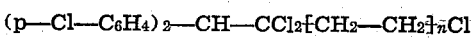

where $n$ is an integer of from 1 to 3, from the reaction mixture.

7. The process which comprises heating a mixture of 1,1,1-trichloro-2,2-bis(p-chlorophenyl) ethane and ethylene in the presence of free radicals produced by the thermal decomposition of an organic peroxide recovering an adduct having the formula

where $n$ is an integer of from 1 to 3, from the reaction mixture.

8. The process which comprises heating a mixture of 1,1,1-trichloro-2,2-bis(p-chlorophenyl)

ethane in the presence of tertiary-butyl hydrogen peroxide and in the presence of ethylene under pressure of 500 to 1,000 pounds per square inch at a temperature of about 140° C. for from 10 to 48 hours, and recovering an adduct having the formula $$(p\text{---}Cl\text{---}C_6H_4)_2CH\text{---}CCl_2[CH_2\text{---}CH_2]_nCl$$

where $n$ is an integer of from 1 to 3 from the reaction mixture.

9. A new chemical having the formula $$(p\text{---}Cl\text{---}C_6H_4)_2CH\text{---}CCl_2[CH_2\text{---}CRR']_nCl$$

where $n$ is an integer of from 1 to 3 and R and R' are selected from the group consisting of hydrogen and alkyl.

ELBERT C. LADD.

REFERENCES CITED

The following references are of record in the file of this patent:

UNITED STATES PATENTS

| Number | Name | Date |
|---|---|---|
| 2,440,800 | Hanford et al. | May 4, 1948 |